Sept. 28, 1971  R. H. ADAMS  3,608,227
ILLUMINATED FISHING FLOAT
Filed May 26, 1969  3 Sheets-Sheet 1

ROBERT H. ADAMS
INVENTOR.

BY Wm. R. Price
ATTORNEY

United States Patent Office 3,608,227
Patented Sept. 28, 1971

3,608,227
ILLUMINATED FISHING FLOAT
Robert H. Adams, 826 Calle-Francita,
Tucson, Ariz. 82706
Filed May 26, 1969, Ser. No. 827,520
Int. Cl. A01k 93/00
U.S. Cl. 43—17                        7 Claims

ABSTRACT OF THE DISCLOSURE

A battery powered fishing float having a bulb which is actuated by a bite or strike on the fishing line and a simple and inexpensive switch which makes or breaks the circuit through the use of a unique U-shaped, battery support and contact member. The light is off except when there is a bite or pressure on the line. Consequently, the device can be used for day or night fishing without appreciable drain on the battery.

FIELD OF THE INVENTION

This invention relates to illuminated fishing floats especially designed for night fishing. More specifically, this invention relates to battery-powered fishing floats containing a bulb which is actuated by the strike of the fish on the fishing line. More specifically, this invention relates to a new and novel switching arrangement for use in an illuminated fishing float.

DESCRIPTION OF THE PRIOR ART

Illuminated fishing floats of various designs have been known before. In one type of illuminated fishing float, the light was always on except when there was a bite on the line. Consequently, this type of fishing float was not applicable to both day and night time usage. Examples of this type of fishing float are shown in U.S. Pat. 2,272,802 and U.S. Pat. 3,292,294.

Another type of illuminated fishing float is a type which employs a mechanism to utilize the bite of a fish as a means for actuating the light. Generally, such devices have not been commercially successful since they required an expensive and intricate mechanism for actuating the light responsive to the strike on the fishing line. In other instances, the devices have called for an external actuating mechanism which tended to become fouled in weeds or debris. See, for example, the patent to Burke, 2,490,669, or the patent to Dignon, 2,446,459.

SUMMARY

The present invention relates to the type of illuminated fishing float which is actuated by the strike of the fish on the line. According to my invention, a simple and rugged switching mechanism is utilized which makes use of a combined battery support and contact member which at all times holds the battery in engagement with the bulb. The switching mechanism itself consists of an electric lead in operative engagement with the bulb and connected to a plunger or a spring surrounding the plunger which, when depressed by pressure on the line, comes into contact with the normally open contact of the combined battery support and contact member. The combination battery support and contact member is a U-shaped, electrically conductive member having an upper leg in contact with the lower part of the battery, but in insulated relation with the spring-biased plunger, and a lower leg which is in normally open position. The simplicity and ruggedness of the device allows the battery and the bulb to be easily removed and installed and provides for a rugged and inexpensive unit.

DESCRIPTION OF THE PREFERRED EMBODIMENTS

Figure 1:
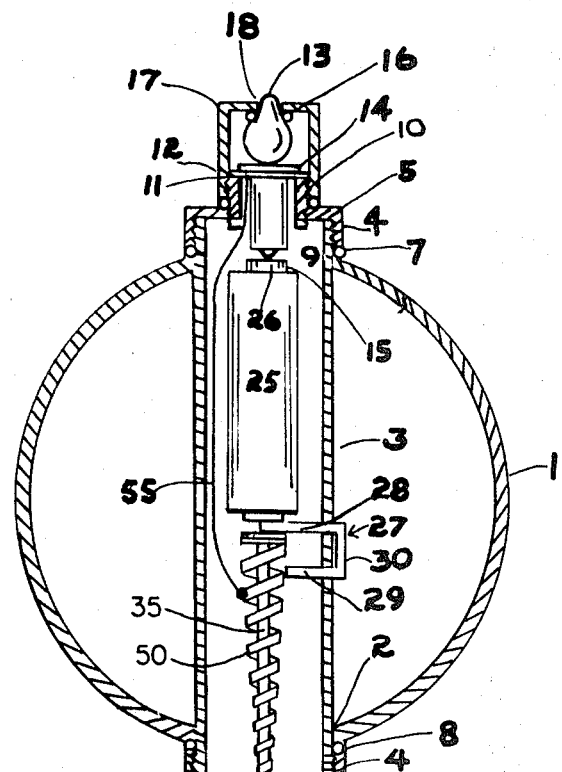
FIG. 1 is a side sectional view, partly in elevation, illustrating the complete unit of my invention.
Figure 2:
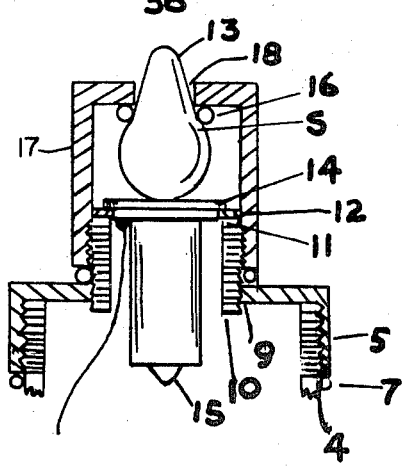
FIG. 2 is an enlarged fragmentary view illustrating the relation of the bulb, ground ring and cap.
Figure 3:
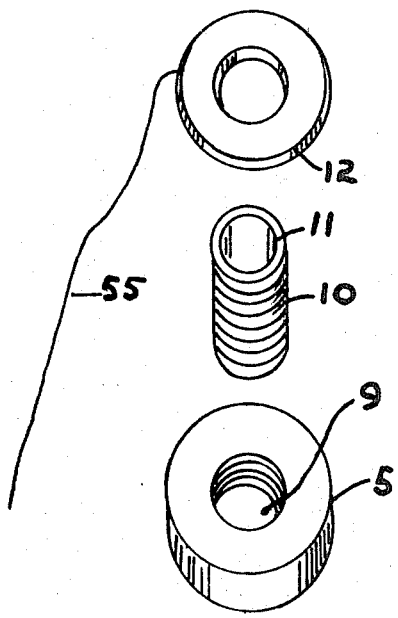
FIG. 3 is an exploded view illustrating the relationship of the cap, sleeve and ground ring.
Figure 4:
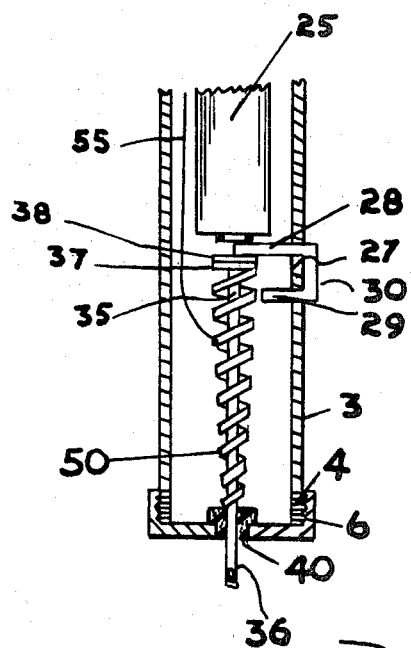
FIG. 4 is a fragmentary view of the lower portion of the unit showing the circuit closed.

Referring now to the drawings in detail, the illuminated fishing float of my invention is comprised of a conventional round, plastic float 1 containing an opening 2 in the top and bottom for provision of a tubular casing 3. The tubular casing is threaded at point 4 at either end for provision of threaded cap 5 at the top and threaded cap 6 at the bottom. It will be noted that threaded cap 5 is screwed down over O-ring 7 at the top while the threaded cap 6 is screwed down against O-ring 8 at the bottom to prevent any water from entering into the round float 1 through opening 2.

In the center of threaded cap 5 is a threaded bore 9 for provision of externally threaded sleeve 10. The externally threaded sleeve 10 projects upwardly to form a sort of hollow threaded stud having shoulder 11 on which ground ring 12 fits. Fitted on ground ring 12 is flange 14 of electric bulb 13 and its casing extends downwardly through the opening of threaded sleeve 10 so that its terminal 15 is in engagement with the terminal 26 of battery 25. It will be noted that the bulb 13 is a conventional pen-light bulb having a shoulder S on which O-ring 16 is fitted so that when threaded cap 17 containing bore 18 is screwed down on the threaded sleeve 10 water is prevented from entering the apparatus. If necessary, another O-ring can be provided between threaded cap 17 and threaded sleeve 10.

As illustrated, the battery 25 is removably fitted into the casing 3 so that it rests on contact and battery support 27. The contact and battery support is a U-shaped member consisting of an upper leg 28, a lower leg 29, and a bight portion 30 which is, as illustrated, outside of the wall of casing 3. This member is made of a number 16 copper wire which is heated and forced through the wall 3 of the tubular casing so that the upper leg is of sufficient height to support battery 25 with its terminal 26 in engagement with terminal 15 of bulb 13. The lower leg 26 thus forms a normally open contact for reasons which will now be described.

Figure 5:
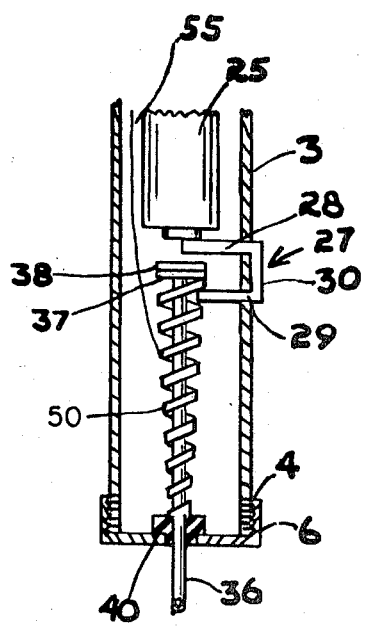
FIG. 5 is a fragmentary view showing the electric lead connected to the flange of the plunger with the circuit in open position.

Situated in insulated relation with the upper leg 28 of battery support and contact member 27 is a plunger 35 consisting of a rod 36 and an upper flange 37 on which a layer 38 of insulation is bonded. At the lower end of the rod 36 extending outside of the casing 3 through lubricated gasket 40 is an eye (not shown) for connection to a fishing line. Surrounding the rod 36 is a spring 50 which urges flange 37 upwardly into engagement with the upper leg 28 of the contact and battery support 27. However, due to the layer of electrical insulation 38 there is no electrical contact of the plunger member with the upper leg 28. Electrically connected between ground ring 12 and a coil of the spring 50 is electric lead 55. Thus, the spring 50 acts as a switch so that when the rod 36 is depressed against the tension of spring 50 by a bite on the line, the upper coil of spring 50 comes into contact with the normally open contact 29 consisting of lower leg 29 of the contact and battery support number 27 (as shown in FIG. 5) so that the circuit is completed and the light becomes illuminated.

Figure 6:
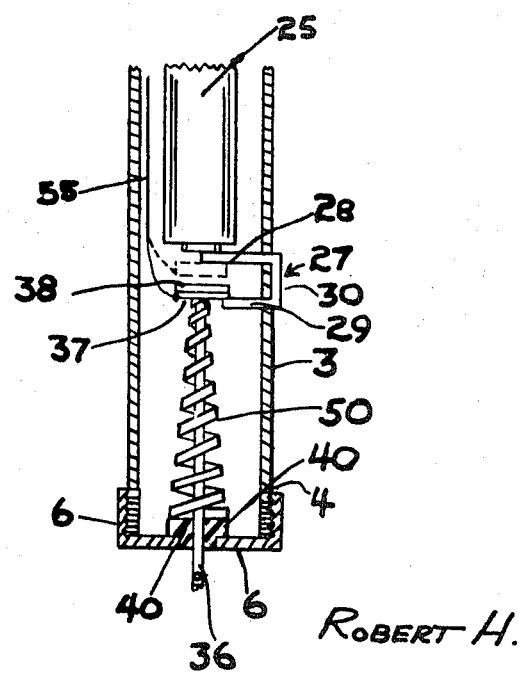
FIG. 6 shows the flange of the plunger in contact with the lower leg of the U-shaped member to close the circuit and thus light the light.

In another embodiment, as illustrated in FIG. 6 the electric lead 55 is connected between the ground ring 12 which is in operative relation with the flange 14 and the casing of bulb 13 and the flange 37 of plunger 35. In this instance, depression of the plunger 35, due to a bite on the fishing line, brings the lower surface of the flange 37 into contact with the normally open contact 27, thus completing the circuit and lighting the light.

In this connection, the rod 36 is considered to be a switch or switching mechanism operative to complete the circuit through contact with normally open contact 29 formed by the lower leg of the contact and battery support member 27. It will be appreciated, of course, that the rod 36 could be fabricated of a non-conducting material such as plastic so that the electrical connection would be through the spring 50 so that the spring functions both physically to push the plunger upwardly and to react to the pressure of the fish's bite to bring the coil of the spring into contact with the contact and battery support member and electrically to complete the circuit and thus act as a switching mechanism.

Many modifications will occur to those skilled in the art from the above detailed description which is meant to be nonlimiting in nature and exemplary except as to be commensurate in scope with the appended claims.

What is claimed is:

1. A fishing float comprising:
   (A) a buoyant body having an opening formed in said body;
   (B) a housing fitted in said opening;
   (C) an electric bulb removably fitted in said housing;
   (D) a battery removably fitted in said housing so that its terminal is in engagement with the terminal of said bulb;
   (E) an electrically conductive U-shaped battery support and contact member having a first leg and a second leg, said U-shaped member being mounted so that said first leg supports the bottom of the battery and forms a contact for said battery while said second leg provides a normally open contact;
   (F) a switching mechanism including a plunger, slidably mounted in the end of said housing and projecting outside said housing for connection to a fishing line,
      (1) said plunger being electrically conductive and terminating in a flange,
      (2) said plunger being in insulated relation with said first leg of said U-shaped member, and
      (3) a spring surrounding said plunger and biasing said plunger towards said U-shaped member and being responsive to the pressure on said plunger,
         (a) said spring being mounted in insulated relation with said first leg of said U-shaped member;
   (G) an electric lead electrically interconnected at one end to said bulb and at the other end to said plunger,
      (1) said electric lead attached to said plunger,
   (H) so that a strike on the fishing line pulls said flange into engagement with said second leg of said U-shaped member to complete the circuit and light said bulb.

2. A fishing float comprising:
   (A) a buoyant body having an opening formed in said body;
   (B) a housing fitted in said opening,
   (C) an electric bulb removably fitted in said housing,
   (D) a battery removably fitted in said housing so that its terminal is in engagement with the terminal of said bulb;
   (E) an electrically conductive U-shaped battery support and contact member having a first leg and a second leg, said U-shaped member being mounted so that said first leg supports the bottom of the battery and forms a contact for said battery while said second leg provides a normally open contact;
   (F) a switching mechanism including a plunger, slidably mounted in the end of said housing and projecting outside said housing for connection to a fishing line,
      (1) said plunger being in insulated relation with said first leg of said U-shaped member, and
      (2) a spring surrounding said plunger and biasing said plunger towards said U-shaped member and being responsive to the pressure on said plunger,
         (a) said spring being electrically conductive and mounted so that in expanded condition the coils are out of engagement with said second leg of said U-shaped member,
   (G) an electric lead electrically interconnected at one end to said bulb and at the other end to a coil of said spring,
   (H) so that pressure on said plunger due to a strike on the fishing line compresses said spring to engage a coil with said second leg of said U-shaped member to complete the circuit and light the bulb.

3. A fishing float comprising:
   (A) a buoyant body having an opening formed in said body,
   (B) a housing fitted in said opening,
   (C) an electric bulb removably fitted in said housing,
   (D) a battery removably fitted in said housing so that its terminal is in engagement with the terminal of said bulb;
   (E) an electrically conductive U-shaped battery support and contact member having a first leg and a second leg, said U-shaped member being mounted so that said first leg supports the bottom of the battery and forms a contact for said battery while second leg provides a normally open contact;
      (1) said U-shaped member being mounted so that the bight of the U is permanently attached to the wall of the housing,
   (F) a switching mechanism including a plunger, slidably mounted in the end of said housing and projecting outside said housing for connection to a fishing line,
      (1) said plunger being in insulated relation with said first leg of said U-shaped member, and
      (2) a spring surrounding said plunger and biasing said plunger towards said U-shaped member and being responsive to the pressure on said plunger,
         (a) said spring being mounted in insulated relation with said first leg of said U-shaped member;
   (G) an electric lead electrically interconnected at one end to said bulb and at the other end to said switching mechanism,
   (H) so that pressure on said plunger due to a strike on the fishing line, compresses said spring to complete the circuit between said switching mechanism and said second leg of said U-shaped member.

4. A fishing float as defined in claim 3, in which:
   (A) the bight of the U-shaped member is mounted outside the casing so that the first and second legs project into said casing.

5. A fishing float as defined in claim 4, in which:
   (A) said housing is a tubular member fabricated of an electrically non-conductive plastic; and
   (B) said U-shaped member is heated and said first and second legs are driven through the walls of said tubular member so as to be permanently mounted with the bight of the U-shaped member on the outside of said casing.

6. A fishing float as defined in claim 3, in which:
(A) the legs of the U-shaped member project toward the middle of said tubular casing,
  (1) said first leg being longer than said second leg.

7. A fishing float comprising:
(A) a buoyant body having an opening formed in said body;
(B) a housing fitted in said opening, said housing comprising a tubular member fabricated of electrically non-conductive material;
(C) an electric bulb removably fitted in said housing,
(D) a battery removably fitted in said housing so that its terminal is in engagement with the terminal of said bulb;
(E) an electrically conductive U-shaped battery support and contact member having a first leg and a second leg, said U-shaped member being mounted so that said first leg supports the bottom of the battery and forms a contact for said battery while said second leg provides a normally open contact;
(F) a switching mechanism including a plunger, slidably mounted in the end of said housing and projecting outside said housing for connection to a fishing line,
  (1) said plunger being in insulated relation with said first leg of said U-shaped member, and
  (2) a spring surrounding said plunger and biasing said plunger towards said U-shaped member and being responsive to the pressure on said plunger,
    (a) said spring being mounted in insulated relation with said first leg of said U-shaped member;
(G) an electric lead electrically interconnected at one end to said bulb and at the other end to said switching mechanism,
(H) so that pressure on said plunger due to a strike on the fishing line, compresses said spring to complete the circuit between said switching mechanism and said second leg of said U-shaped member.

References Cited
UNITED STATES PATENTS

| | | | |
|---|---|---|---|
| 1,529,949 | 3/1925 | Good | 43—17 |
| 2,153,750 | 4/1939 | Goertzen | 43—17 |
| 2,255,959 | 9/1941 | Barber | 43—17 |
| 2,425,825 | 8/1947 | Philips | 43—17 |

SAMUEL KOREN, Primary Examiner

D. J. LEACH, Assistant Examiner